United States Patent [19]

Handtmann et al.

[11] 3,983,848
[45] Oct. 5, 1976

[54] FUEL INJECTION SYSTEM

[75] Inventors: Dieter Handtmann, Sindelfingen; Wolf Wessel, Schwieberdingen; Siegfried Fehrenbach, Markgroningen, all of Germany

[73] Assignee: Robert Bosch G.m.b.H., Stuttgart, Germany

[22] Filed: Apr. 1, 1975

[21] Appl. No.: 564,138

[30] Foreign Application Priority Data

Apr. 25, 1974 Germany............................ 2420030

[52] U.S. Cl. ....................... 123/32 EA; 123/139 E; 123/140 R
[51] Int. Cl.² ......................................... F02M 39/00
[58] Field of Search ........ 123/32 EA, 139 E, 119 R, 123/140 R

[56] References Cited
UNITED STATES PATENTS

| | | |
|---|---|---|
| 3,207,255 | 9/1965 | Hahlganss et al. ...................... 317/5 |
| 3,716,035 | 2/1973 | Adler ............................... 123/139 E |
| 3,724,430 | 4/1973 | Adler ............................... 123/119 R |
| 3,750,632 | 8/1973 | Zechnall ........................... 123/32 EA |
| 3,796,197 | 3/1974 | Locher et al. ..................... 123/139 E |

*Primary Examiner*—Charles J. Myhre
*Assistant Examiner*—Paul Devinsky
*Attorney, Agent, or Firm*—Edwin E. Greigg

[57] ABSTRACT

A fuel injection system for an internal combustion engine is controlled by a follower control loop. The fuel quantity is arbitrarily set by the gas pedal and a first potentiometric transducer generates an electrical command signal. The air flow through the induction tube constitutes the controlled variable whose magnitude is transformed into an electrical signal by a second potentiometer coupled to an air flow rate meter. The two signals are compared at the input of a control amplifier which drives a servomotor. The servomotor adjusts the opening of the air throttle valve of the engine, thereby changing the air flow through the induction tube until the air flow rate meter signals that the air quantity is proportional to the metered out fuel quantity.

16 Claims, 2 Drawing Figures

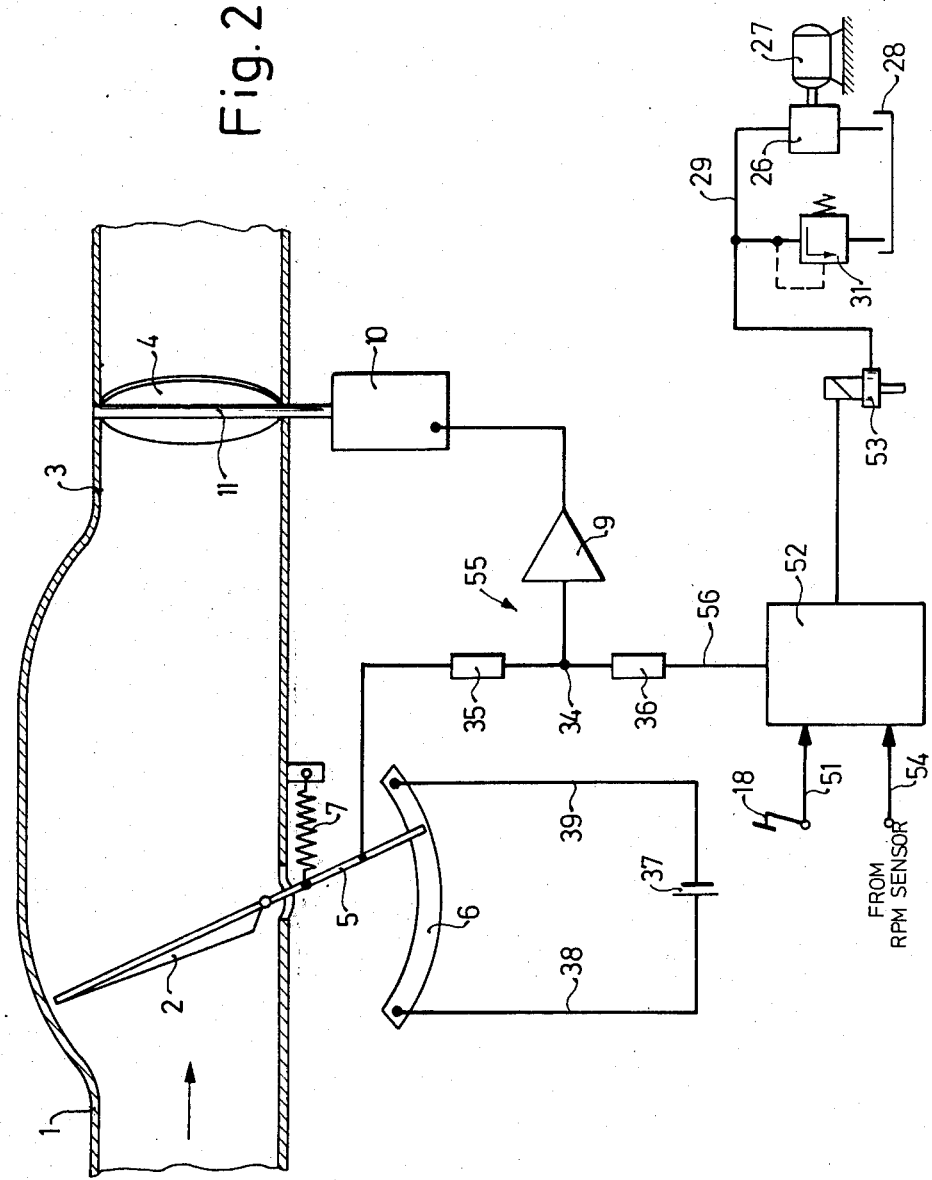

FUEL INJECTION SYSTEM

BACKGROUND OF THE INVENTION

The invention relates to a fuel injection system especially for mixture compressing, externally ignited internal combustion engines in which fuel injection valves inject into the induction tube within which is contained an air flow rate measuring member and a throttle valve, seriatim.

It is the purpose of fuel injection systems of this type to create automatically a favorable fuel-air mixture for all operational conditions of the internal combustion engine so as to produce nearly complete combustion of the fuel and thus to prevent or at least to reduce sharply the generation of toxic components in the exhaust gas while maintaining the highest possible power of the internal combustion engine or the lowest possible fuel consumption.

In known fuel injection systems of this type, the air quantity aspirated by the internal combustion engine is determined by the position of the throttle valve and by the rpm of the engine and a quantity of fuel which corresponds to that aspirated air quantity is supplied by a regulator. These known fuel injection systems have the disadvantage that the metered-out fuel quantity always lags the aspirated air quantity because the air flow rate can be measured only with a certain, finite time delay and fuel can be metered out only thereafter. One of the disadvantages of this delay is the unfavorable transition behavior of the internal combustion engine during a change in the load. For example, when there is a transition from partial load to full load, the fuel air mixture at first becomes leaner because the aspirated air quantity is increased and the desired, corresponding increase of the fuel quantity occurs only after a time delay. On the other hand, during a transition from full load to partial load, the fuel air mixture is at first enriched because the desired reduction of the metered fuel quantity occurs only some finite time after the reduction of the aspirated air quantity.

In the first of these situations, due to the tendency of the fuel-air mixture to become leaner during a transition from partial engine load to full load, the torque of the engine decreases whereas, during a transition from full load to partial load, the torque of the internal combustion engine increases. Yet the desired transition behavior is precisely the opposite of these described conditions, namely increasing torgue during a transition from partial load to full load and decreasing torque during a transition from full to partial load.

OBJECT AND SUMMARY OF THE INVENTION

It is thus a principal object of the invention to provide a fuel injection system of the known and above-described type which is capable of meeting the demands normally made on such a fuel injection system but which does not have the above described disadvantageous behavior during load transitions of the engine.

This object is attained according to the invention by providing, firstly, an air flow rate meter which is associated with a measuring transducer and which provides the controlled variable for a follower control loop, in response to the air quantity aspirated by the internal combustion engine, and by providing, secondly, means for measuring and transducing the injected fuel quantities so as to provide a command variable for the follower control loop and by providing, thirdly, that the follower control loop includes an electric control amplifier which sets the armature of an electro-magnetic servomotor. The servomotor changes the position of the throttle valve of the engine for as long as is necessary until the air flow rate measuring member determines that the aspirated air quantity is again proportional to the injected fuel quantity.

In the fuel injection system according to the invention, it is the injected fuel quantity which is the command or set point variable which is, therefore, set externally, and the corresponding air quantity is adapted to the fuel quantity and becomes the controlled variable. Due to this arrangement of the control process it is the air quantity whose magnitude lags in time with respect to the instantaneous fuel quantity, and thus, during a transition from a partial load condition to a full load condition, the fuel-air mixture becomes richer and hence the engine torque is increased, whereas, during a transition from a full load condition to a partial load condition, the fuel-air mixture becomes leaner and the torque is accordingly reduced. These are precisely the conditions which were described above as being the desired conditions during load transitions of the engine.

An advantageous feature of the invention provides continuous injection of the fuel into the induction tube and a fuel metering valve with a control slide located in the fuel line for the purpose of metering out fuel. the control slide may be actuated in dependence on the position of the gas pedal via a cam-plate embodied as an eccentric which carries a ball-bearing. The control slide of the fuel metering valve and the shaft of the eccentric are positively connected by means of a spring clamp.

In a second preferred and advantageous feature of the invention, the wiper of the common potentiometer which serves as the measuring transducer which generates the set point or command variable can be actuated by a control shaft which transmits the position of the gas pedal lever to the eccentric. It is further provided that the wiper of the feedback potentiometer which serves as the measuring transducer for providing the feedback of the magnitude of the controlled variable may be actuated by the air flow rate measuring member. The preferred feature further provides that the command potentiometer and the feedback potentiometer are located in the arms of an electric bridge circuit whose summation point is connected to the input of a servo-or control-amplifier.

In yet another preferred and advantageous feature of the invention, it is provided that a drag lever and a spring are connected between the control shaft and the gas pedal and, further, that the position of the drag lever may be limited by a stop for limiting the maximum permissible injected fuel quantity. The position of the stop can be adjusted in dependence on the rpm of the engine by a stop adjustment motor which is itself controlled by a second follower control loop containing an electric control amplifier. The second follower control loop uses the magnitude of the rpm of the internal combustion engine to serve as the command variable and its controlled variable is the position of the stop which is transduced by a potentiometer acting as a measuring transducer and is fed back to the second follower control loop. The limitation of the maximum permissible fuel injection quantity is effective only during full-load operation of the engine.

In yet another, preferred feature of the invention, the electric control amplifier has the characteristic behavior of a proportional-integral controller with differential action (PID controller).

An equally preferred and advantageous feature of the invention provides that the command potentiometer and the feedback potentiometer are connected to the two terminals of the voltage source in the opposite electrical sense and further that both the servomotor for actuating the throttle valve and the stop adjustment motor are embodied as motors without commutators.

Still another advantageous feature of the invention provides that, when the control shaft has rotated through approximately 45° measured from the bottom dead center position of the eccentric, then the control slide which meters out a fuel quantity in proportion to its position closes the fuel metering valve, whereas it opens the fuel metering valve when that rotational angle $\alpha$ of the control shaft is greater than approximately 45°. It is further provided that the command potentiometer, the feedback potentiometer, the follower control loop as well as the air flow rate measuring member all have linear operating characteristics.

An alternative advantageous feature of the invention provides that, when the control shaft is at an angle $\alpha$ of 0°, measured from the bottom dead center position of the eccentric, then the control slide which normally meters out a fuel quantity in proportion to its position closes the fuel metering valve, whereas it opens the fuel metering valve when said rotational angle $\alpha$ of the control shaft is greater than 0°, whereby the mechanical transmission of the command variable to the control slides takes place according to a non-linear function which is approximately similar to the non-linear, especially logarithmic characteristic function obeyed by the air flow rate measuring member. This feature further provides that the feedback potentiometer and the follower control loop both operate linearly whereas the command potentiometer is non-linear in operation.

Another alternative advantageous feature of the invention provides that fuel injection into the induction tube takes place intermittently by means of electromagnetic fuel injection valves whose opening duration depends on the position of the gas pedal. The position of the gas pedal is sensed by a measuring transducer and is fed to an electronic controller which controls the fuel injection valve and forms the product of the measured valves of the rpm of the internal combustion engine and the position of the gas pedal. This product corresponds to the injected fuel quantity and serves as the command variable of the follower control loop. The magnitude of the controlled variable is generated by a feedback potentiometer whose wiper is actuated by the air flow rate measuring member. The feedback potentiometer and the electronic controller are disposed in a bridge circuit whose summation point is connected to the input of the control amplifier.

The invention will be better understood as well as further objects and advantages will become more apparent from the ensuing detailed specification of two exemplary embodiments taken in conjunction with the drawing.

BRIEF DESCRIPTION OF THE DRAWING

FIG. 2 depicts a second exemplary embodiment of the fuel injection system according to the invention.

DESCRIPTION OF THE PREFERRED EMBODIMENT

Figure 1:
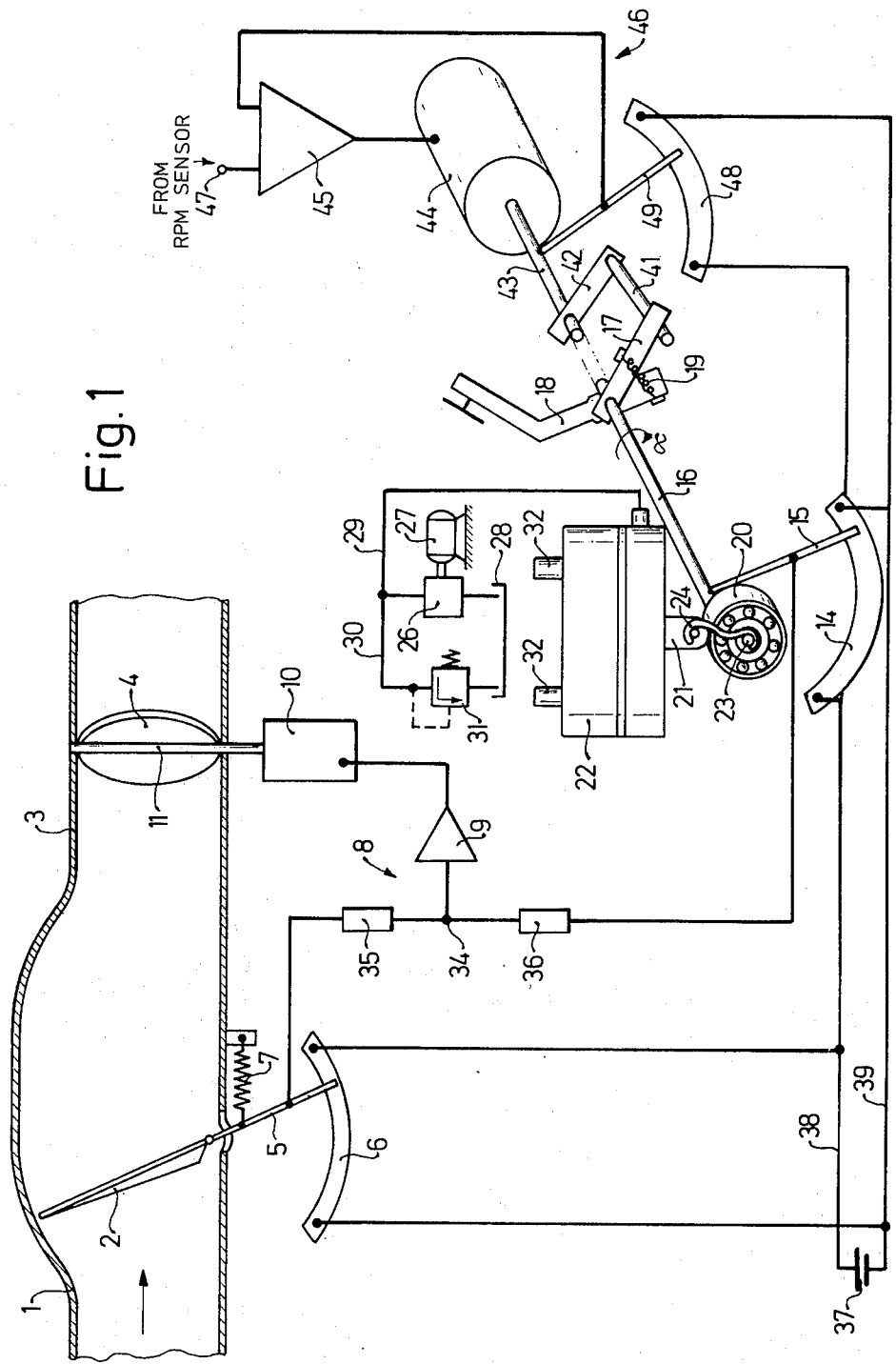
FIG. 1 depicts a first exemplary embodiment of the fuel injection system according to the invention.

Turning now to FIG. 1, there may be seen an induction tube region 1 through which combustion air flows in the direction of the arrow around an air flow rate measuring member 2. The air then flows through an induction tube region 3, containing a throttle valve 4, and continues to flow to one or several cylinders (not shown) of an internal combustion engine. The air flow rate measuring member 2 is an air baffle valve 2, pivotably attached at one side in the induction tube wall. The baffle actuates the wiper 5 of a feedback potentiometer 6 acting as a measuring transducer and it pivots against the force of a weak restoring spring 7. Known electronic air flow rate meters could be used to serve as the air measuring member. The magnitude of the controlled variable, characterized by the position of the air flow rate measuring member 2, is fed back by the potentiometer 6 to a follower control loop 8, which includes a servo-or control amplifier 9, driving a servomotor 10. The armature of the servomotor 10 is coupled to the shaft 11 of the throttle valve 4 and determines its position.

The magnitude of the command variable, characterized by the injected fuel quantity, is fed to the control loop 8 by a command potentiometer 14, serving as a measuring transducer. The wiper 15 of this command potentiometer 14 is coupled to a control shaft 16 which may be rotated in dependence on the position of a gas pedal 18. A drag lever 17 is fixedly attached to the control shaft 16 and is coupled to the gas pedal 18 with a spring 19. The magnitude of the comand variable for the follower control loop 8, as determined by the position of the gas pedal lever 18, is transmitted by the control shaft 16 via an eccentric and a ball bearing 20 mounted thereon to a fuel control slide 21 which is the moving valve member of a fuel metering valve assembly 22. The control slide 21 meters out a fuel quantity which corresponds to the position of the gas pedal 18. A shaft 23 on the eccentric and the control slide 21 are positively connected with one another by a spring clamp 24.

Fuel is supplied to the fuel metering valve 22 by a fuel pump 26 driven by an electric motor 27, which delivers fuel from a fuel container 28 through a line 29 to the fuel metering valve 22. Branching off from the fuel line 29 is a return line 30 containing a pressure limiting valve 31 which permits fuel to flow back into the container 28 when the fuel system pressure becomes excessive. The fuel quantity metered out by the control slide 21 flows through a fuel injection line 32 to the fuel injection valves which are not shown and which are located within the induction tube of the engine in the immediate vicinity of the cylinders and which inject fuel continuously.

The comparison of the magnitude of the command variable, as determined by the command potentiometer 14, with the magnitude of the controlled variable, as determined by the feedback potentiometer 6, takes place at the summation point 34 of an electrical bridge comparator circuit, connected to the input of the control amplifier 9. The bridge circuit includes the command potentiometer 14 and the feedback potentiometer 6 as well as resistors 35 and 36. The voltage source is a vehicle storage battery 37 whose two terminals are connected to the command potentiometer 14 and to the feedback potentiometer 6 in the opposite electrical sense through lines 38 and 39.

The motion of the drag lever 17 may be limited by a stop bar 41 which is attached to a lever 42 mounted on a rotating shaft 43 of a stop setting motor 44. The stop setting motor 44 is controllable by a second follower control loop 46, containing an electric control amplifier 45 and its command variable is a signal related to the measured value of the rpm of the internal combustion engine which is admitted through a line 47. The controlled variable is the position of the stop 41 which is sensed by a potentiometer 48 acting as a measuring transducer and which is fed back to the second follower control loop 46 by a wiper 49 attached to the rotational shaft 43.

The method of operation of the fuel injection system depicted in FIG. 1 is as follows:

When the internal combustion engine is running, the position of the gas pedal 18 determines the quantity of injection fuel metered out by the fuel metering valve 22. The mechanical motion of the gas pedal lever 18 is transmitted by drag lever 17 to the control shaft 16 which rotates the eccentric with its ball bearing 20. The electrical signal produced by the potentiometer 14 relates to fuel quantity and serves as the command variable for the first follower loop 8 which controls the servomotor 10. The motor 10 adjusts the position of the throttle valve 4 until the electrical signal from the feedback potentiometer 6, coupled to the air flow rate measuring member 2, indicates that the air quantity is again proportional to the injected fuel quantity. The command potentiometer 14 and the feedback potentiometer 6 are connected to the voltage source 37 in the opposite electrical sense through lines 38 and 39. This type of connection brings the advantage that the entire voltage range of the voltage source 37 is available for supplying the command potentiometer 14 and the feedback potentiometer 6 and this results in increased precision of the control loop.

The maximum permissible fuel quantity depends on the rpm of the internal combustion engine. Hence, the motion of the drag lever 17 must be limited by a stop bar 41 so that the gas pedal lever 18 is unable to set any arbitrary fuel quantity. The stop bar 41 is fastened to a lever 42 on the rotating shaft of the stop setting motor 44, which is controlled by a second follower control loop 46 whose command variable is a signal related to the rpm of the internal combustion engine. However, a limitation of the maximum fuel injection quantity is required only when the internal combustion engine is operating at full load.

Since the rotary motions of the servomotor 10 and of the stop setting motor 44 are always less than 90°, they may both be embodied without commutators.

The stroke $H$ of the fuel control slide 21 is related to the angular motion $\alpha$ of the control shaft 16 by the transfer function $H = a(1 - \cos \alpha)$. This function is approximately linear in the working domain of the servomotor corresponding to a rotation of the control shaft 16 between approximately $\alpha = 45°$ and approximately $\alpha = 135°$, measured from the bottom dead center position of the eccentric. In this formula, $a$ is the distance between the center of the control shaft and the shaft 23 on the eccentric. The relation between the stroke of the control slide 21 and the metered-out fuel quantity is linear and the actions of the command potentiometer 14, the feedback potentiometer 6 and the follower control loop 8 are also linear which insures that the quantity of air admitted by the throttle valve 4 is proportional to the metered out fuel quantity.

In this version of the first embodiment of the invention, the control slide 21 closes the fuel metering valve 22 when the control-shaft angle $\alpha$ is approximately 45°, whereas it opens the valve when the rotational angle $\alpha$ is greater than approximately 45°. The actuating motion of the gas pedal 18 is opposed by a restoring spring (not shown) which tends to pull the gas pedal lever 18 and the drag lever 17 into their quiescent positions.

In order to improve tha accuracy of adaptation of the air quantity to the fuel quantity in the domain of low partial engine loads, as opposed to the domain of high partial loads and full load, it is advantageous if the air flow rate measuring member 2 is so embodied that it has a non-linear, especially a logarithmic characteristic behavior. In this case, in order to restore the proportional relationship between the metered-out fuel quantity and the aspirated air quantity, the transmission of the rotational motion of the control shaft 16 to the control slide 21 must also be non-linear. This will be the case if, as is provided in a second verson of the first embodiment of the invention, the control slide 21 closes the fuel metering valve 22 when the angle of rotation $\alpha$ of the control shaft, measured from the bottom dead center of the eccentric is equal to 0° whereas it opens the valve when the control shaft angle $\alpha$ is greater than 60°. In order to permit compensation for small deviations of the transfer function relating the motions of the control shaft 16 and the control slide 21 from the characteristic operating curve of the air quantity measuring member 2, the command potentiometer 14 may also be made non-linear whereas the feedback potentiometer 6 and the follower loop 8 retain their linear characteristics.

The electrical control amplifiers 9 and 45 have the characteristics of proportional-integral controllers with differential action (PID controllers).

Turning now to FIG. 2, in the second exemplary embodiment of the invention shown therein, elements which are identical to those of FIG. 1 retain the same reference numerals. In this second embodiment, the position of the gas pedal lever 18 is sensed by a measuring transducer (not shown) whose signal is fed through a line 51 to an electronic controller 52 which, in response, controls the opening time of the intermittently operating electromagnetic fuel injection valves 53 which inject fuel into the induction tube. Through a line 54, the electronic controller 52 is also supplied with a signal related to the measured value of the rpm of the internal combustion engine and it forms a calculated product of the signals relating to the measured values of the rpm and to the position of the gas pedal lever 18. This product corresponds to the injected fuel quantity and is used as the command variable which is fed through a line 56 to a follower control loop 55. Any desired multiplicative corrections may suitably be applied to the controller 52 during the calculation.

The method of operation of the second embodiment of the fuel injection system according to the invention, as shown in FIG. 2, is as follows:

The position of the gas pedal 18 is transformed by a measuring transducer into an electric signal which is fed to the controller 52. This controller responds to the measured position of the gas pedal and actuates the electromagnetic fuel injection valves 53 which are supplied with fuel through lines 29 by the fuel pump 26, driven by the electric motor 27. The electronic controller 52 is also supplied with the measured valve of the rpm of the internal combustion engine, through an input line 54. The product formed in the controller 52, deriving from the measured value of the rpm and the position of the gas pedal lever, serves as the command variable for the follower control loop 55 and corresponds to the fuel quantity which is injected intermittently by the fuel injection valves 53. The magnitude of the controlled variable and the magnitude of the command variable are compared with one another in the summation point 34 of an electrical bridge circuit 6, 35, 36, 52 at the input of the control amplifier 9. The output of the control amplifier 9 drives the servomotor 10 which adjusts the position of the throttle valve 4 until such time as the air flow rate measuring member 2 moves to a position which indicates the the aspirated air quantity is again proportional to the injected fuel quantity.

The two exemplary embodiments of a fuel injection system, as depicted in FIGS. 1 and 2, have the advantage of an automatic full-load fuel enrichment which depends on acceleration and on rpm. Furthermore, during a transition to a higher engine load, the system guarantees an increasing engine torque as well as a smooth and uniform performance during all load changes.

That which is claimed is:

1. In a fuel injection system, especially for an internal combustion engine of the type which uses continuous injection type fuel injection valves to inject fuel into the induction tube and which incorporates an electric battery, fuel metering means having a control slide and gas pedal means, which system includes
   A. an air flow measuring member, disposed in said induction tube;
   B. throttle valve means, disposed in said induction tube downstream of said air flow measuring member; the improvement comprising:
   C. first measuring transducer means, coupled to said fuel metering means to provide first electrical signals related to fuel flow, said fuel flow serving as a command variable;
   D. second measuring transducer means, coupled to said air flow measuring member to provide second electrical signals related to the air flow which serves as a controlled variable;
   E. first control amplifier means; commanded by said first measuring transducer means and mediately receiving said second electrical signals;
   F. electromagnetic servomotor means, including an armature, controlled by said first control amplifier means;
   G. linkage means, for transmitting the setting motions of said servomotor means to said throttle valve means; and
   H. eccentric cam-plate means, rotated mediately by the gas pedal means of the engine and disposed to move said fuel control slide;
   whereby the position of said throttle valve means is changed by said servomotor means to maintain a desired proportionality between the fuel and air quantities supplied to the engine.

2. A fuel injection system as defined in claim 1, wherein said eccentric cam-plate means includes a ball bearing mounted thereon.

3. A fuel injection system as defined in claim 1, wherein said eccentric cam-plate means and said fuel control slide are coupled by a spring clamp.

4. A fuel injection system as defined in claim 1, wherein said first measuring transducer means is a first potentiometric transducer means and second measuring transducer means is a second potentiometric transducer means, and wherein said system further comprises:
   I. control shaft means, rotated mediately by the gas pedal and disposed to rotate said eccentric cam-plate means;
   wherein said first electrical signals are compared with said second electrical signals, thereby providing an input to said first control amplifier means.

5. A fuel injection system as defined in claim 4, wherein said control shaft means, said eccentric cam-plate means and said control slide in said fuel metering means are so coupled that said control slide interrupts the fuel flow through said fuel metering means when the angle of rotation of said control shaft, as measured from the bottom dead center position of said eccentric cam-plate means, is 45°, whereas it permits fuel flow therethrough when said angle of rotation is greater than 45°, and wherein said first and second potentiometric transducer means and said air flow measuring member have linear operating characteristics.

6. A fuel injection system as defined in claim 4, wherein said control shaft means, said eccentric cam-plate means and said control slide in said fuel metering means are so coupled that said control slide interrupts the fuel flow through said fuel metering means when the angle of rotation of said control shaft, as measured from the bottom dead center position of said eccentric cam-plate means, is 0°, whereas it permits fuel flow therethrough when said angle of rotation is greater than 0°, and wherein said air flow rate measuring member has a non-linear characteristic, said control shaft means and said control slide means moving relatively according to substantially the same non-linear characteristic, while said second potentiometric transducer means and said first control amplifier means have linear operating characteristics, whereas said first potentiometric transducer means have a non-linear operating characteristic.

7. A fuel injection system as defined in claim 4, wherein said first and said second potentiometric transducer means are connected to the electric battery with opposite respective polarities.

8. A fuel injection system as defined in claim 4, wherein a drag lever and a spring are attached between the gas pedal and said control shaft means.

9. A fuel injection system as defined in claim 8, further comprising:
   K. a stop adjustment motor controllable in dependence on engine rpm and provided with stop means so disposed as to limit the motion of said drag lever.

10. A fuel injection system as defined in claim 9, wherein said electromagnetic servomotor means and said stop adjustment motor are embodied without commutators.

11. A fuel injection system as defined in claim 9, wherein said stop means are so disposed as to limit the motion of said drag lever only under full-load conditions of the engine.

12. A fuel injection system as defined in claim 9 further comprising:
   L. second control amplifier means for controlling the motion of said stop adjustment motor in dependence on engine rpm; and M. third potentiometric means, coupled to said stop means for producing third electrical signals related to the position of said stop means;

said third signals being fed back to the input of said second control amplifier means, thereby constituting a control loop.

13. A fuel injection system as defined in claim 12, wherein said first and said second control amplifier means have the characteristics of proportional-integral controllers with differential action (PID controller).

14. A fuel injection system as defined in claim 1, wherein said fuel injection valves are electromagnetic fuel injection valves and further comprising:

electronic controller means, including said first measuring transducer means, for controlling the electromagnetic valves in intermittent manner and for controlling the opening times thereof.

15. A fuel injection system as defined in claim 14, wherein said electronic controller uses rpm data and data related to the position of said gas pedal means to form a command signal related to the fuel flow and wherein said second measuring transducer means is a potentiometric transducer means.

16. A fuel injection system as defined in claim 15, wherein the output from said potentiometric transducer means and the output from said electronic controller is fed to a summing junction also connected to said first control amplifier means.

\* \* \* \* \*